(12) United States Patent
Ayyer et al.

(10) Patent No.: US 7,396,522 B2
(45) Date of Patent: Jul. 8, 2008

(54) CATALYST USEFUL FOR REMOVAL OF HYDROGEN SULPHIDE FROM GAS STREAM AND ITS CONVERSION TO SULPHUR, A PROCESS FOR PREPARING SUCH CATALYST AND A METHOD FOR REMOVING OF HYDROGEN SULPHIDE USING SAID CATALYST

(76) Inventors: Jayalekshmy Ayyer, 33/7, GNFC Township, P.O. Narmadanagar 392 015, District Bharuch, Gujarat (IN); Pradipkumar Maheshchandra Shah, 7/12, GNFC Township, P.O. Narmadanagar 392 015, District Bharuch, Gujarat (IN); Virendra Bhikhabhai Patel, 3/1 Nandanvan Society, P.O. Narmadanagar 392 015, District Bharuch, Gujarat (IN)

(*) Notice: Subject to any disclaimer, the term of this patent is extended or adjusted under 35 U.S.C. 154(b) by 688 days.

(21) Appl. No.: 10/729,746

(22) Filed: Dec. 5, 2003

(65) Prior Publication Data
US 2005/0123470 A1   Jun. 9, 2005

(51) Int. Cl.
*B01J 23/00* (2006.01)
*B01J 27/02* (2006.01)
*B01J 21/00* (2006.01)
*B01J 20/00* (2006.01)
*C01B 17/02* (2006.01)

(52) U.S. Cl. .................. 423/573.1; 502/63; 502/74; 502/80; 502/84; 502/87; 502/326; 502/327; 502/336; 502/338; 502/355; 502/415; 502/439

(58) Field of Classification Search ............... 502/63, 502/74, 80, 84, 87, 326, 327, 336, 338, 415, 502/355, 439; 423/573.1
See application file for complete search history.

(56) References Cited

U.S. PATENT DOCUMENTS

| | | | | |
|---|---|---|---|---|
| 2,430,289 A * | 11/1947 | Gary | ............................. | 502/81 |
| 2,449,891 A * | 9/1948 | Gary et al. | ..................... | 502/11 |
| 3,235,512 A * | 2/1966 | Koepernik | .................... | 502/63 |
| 3,704,329 A * | 11/1972 | Rindtorff et al. | ............. | 568/896 |
| 3,752,773 A * | 8/1973 | Duke, Jr. et al. | ............... | 502/63 |
| 3,839,229 A * | 10/1974 | Senes et al. | .................... | 502/73 |
| 4,003,850 A * | 1/1977 | Callighan et al. | ............. | 502/74 |
| 4,436,834 A * | 3/1984 | Wright | ....................... | 502/201 |
| 4,460,706 A * | 7/1984 | Imanari et al. | ............... | 502/304 |
| 4,774,213 A * | 9/1988 | Schneider et al. | ............. | 502/81 |
| 5,023,221 A * | 6/1991 | Occelli | ......................... | 502/66 |
| 5,214,014 A * | 5/1993 | Yoshimoto et al. | ............ | 502/84 |
| 6,784,135 B2 * | 8/2004 | Scholten et al. | ............. | 502/245 |
| 6,994,792 B2 * | 2/2006 | Schlegel | ...................... | 210/660 |
| 7,045,486 B2 * | 5/2006 | Wang et al. | .................. | 502/439 |
| 7,176,159 B1 * | 2/2007 | Wheelock et al. | ............ | 502/303 |

* cited by examiner

*Primary Examiner*—Cam N. Nguyen
(74) *Attorney, Agent, or Firm*—John P. White; Cooper & Dunham LLP

(57) ABSTRACT

The present invention relates to a catalyst useful for removal of hydrogen sulphide from gas streams and its conversion to sulphur, a process for preparing such catalyst and a method for removing of hydrogen sulphide using said catalyst.

36 Claims, No Drawings

CATALYST USEFUL FOR REMOVAL OF HYDROGEN SULPHIDE FROM GAS STREAM AND ITS CONVERSION TO SULPHUR, A PROCESS FOR PREPARING SUCH CATALYST AND A METHOD FOR REMOVING OF HYDROGEN SULPHIDE USING SAID CATALYST

FIELD OF THE INVENTION

The invention relates to a catalyst comprising 0 to 95% by weight clay, 0 to 95% by weight gypsum and 0 to 95% by weight alumina and 5 to 60% by weight hydrated iron oxide and heated to temperatures between 100 and 650° C. for enhanced activity for removal of hydrogen sulphide from gas streams and its conversion to sulphur a process for preparing such catalyst and a method for removing hydrogen sulphide using said catalyst.

BACKGROUND AND PRIOR ART REFERENCES

Hydrogen sulphide is a highly toxic and corrosive environmental pollutant with an obnoxious smell which needs to be removed for pollution control as well as process requirements in industries. Natural gas processing complexes, refineries, sulphur processing chemicals industries, pharmaceutical industries, sugar industries, sewage treatment plants and biogas generating units are some of the major industries which need an economically viable solution for $H_2S$ removal and its safe disposal.

A number of processes have been known and are in commercial use for removing hydrogen sulphide from gas streams. However, these processes have some inherent limitations. The processes used for removal of $H_2S$ and there disadvantages are described in detail hereafter. Claus process is used for removing hydrogen sulphide from gases containing typically high concentration of $H_2S$ (more than 20% by vol of $H_2S$). Liquid Redox process is used for removing hydrogen sulphide from gases containing typically low concentration of $H_2S$.

Both the aforesaid process have the disadvantages of high capital and operating cost. Processes using iron sponges as catalyst have been in use wherein iron oxide deposited on wood shaving is used for removing hydrogen sulphide from gases. The major disadvantage with such a catalyst that these can be used as only once-through catalyst i.e. the catalyst after being used for removal of H2S can not be regenerated and hence has to be disposed as waste. Therefore, the cost of such treatment is high due to the use of stoichiometric quantities of chemicals and also disposal of the used materials.

Further, loading capacity i.e. the extent upto which the wood shavings can be loaded with the iron oxide is low, due to which, the hydrogen sulphide removal capacity in a single pass is limited. Also, safe disposal of the used catalyst is major problem.

In yet another process for hydrogen sulphide removal, a hot zinc oxide bed is used.

Zinc oxide is costlier than iron oxide. Another limitation of the process is that the bed gets exhausted after treating stoichiometric quanity of hydrogen sulphide once through the bed. The need of higher temperature for effective removal is another disadvantage as the gas needs to be preheated prior to treatment. Zinc oxide gets converted to zinc sulphide which is disposed off after the bed gets exhausted.

From the above descriptions of prior art, it is clear that there is a need for a more economical and simple process for hydrogen sulphide removal and its conversion to elemental sulphur using a solid bed incorporating inexpensive chemicals which can be regenerated and reused multiple times. This is the main objective of the present invention.

OBJECTIVE OF INVENTION

The objective of the present invention is to provide an iron oxide based catalyst which can be used multiple times for removal of hydrogen sulphide from gas streams containing the same and its conversion to element sulphur.

Another objective of the present invention is to provide process for preparing aforesaid catalyst.

One another objective of the present invention is to provide a method for removal of sulphur compounds from a gas stream comprising the same and recovery of elemental sulphur therefrom using aforesaid catalyst.

STATEMENT OF INVENTION

The present invention relates to a catalyst useful for removal of hydrogen sulphide from gas streams containing the same and its conversion to elemental sulphur, the said catalyst comprising 0 to 95% by weight clay, 0 to 95% by weight gypsum and 0 to 95% by weight alumina and 5 to 60% by weight hydrated iron oxide and heated to temperatures between 100 and 650° C. for enhanced activity and, The present invention further relates to a process for preparing a catalyst useful for removing hydrogen sulphide from a gas stream and recovering elements sulphur therefrom said process comprising the steps of:

a) mixing of 0 to 95% by weight clay, 0 to 95% by weight gypsum, 0 to 95% by weight alumina and 5 to 60% by weight hydrated iron oxide, and b) granulating, pelletizing or pulverizing the mixture of step (a) and heating the same at temperature in the range of 100° C. to 650 C to obtain the catalyst.

The present invention also relates to a method for removal of sulphur compounds from a gas stream comprising the same and recovery of elemental sulphur therefrom, said method comprising the steps of:

a) mixing moist air/water with the gas stream comprising the sulphur compound for converting the sulphur compound to hydrogen sulphide.

a) Contacting the gas stream containing hydrogen sulphide with a catalyst comprising to 0 to 95% by weight clay, 0 to 95% by weight gypsum, 0 to 95% by weight alumina and 5 to 60% by weight hydrated iron oxide to remove hydrogen sulphide by chemisorption and a) regenerating the spent catalyst by passing air through or over the same to oxides of iron and converting iron sulphides to iron oxides and elemental sulphur.

SUMMARY

The solid material used for hydrogen sulphide is made by an inventive method to enable loading of the active content to high levels as well as improve its activity by a unique heat treatment method. The process also is designed to render the medium porous for greater gas penetration and availability of reactive sites. The repeated ability to regenerate the active chemical entity in the system renders the process catalytic in nature. The chemical reactions which enable the process of hydrogen sulphide removal and regeneration of the active content of the solid medium are given below:

A. Hydrogen Sulphide Removal Reactions $$Fe_2O_3 + 3H_2S \rightarrow Fe_2S_3 + 3H_2O \qquad 1.$$

$$Fe_2S_3 \rightarrow 2\,FeS + S \qquad 2.$$

$$2FeS + 1\tfrac{1}{2}O_2 \rightarrow Fe_2O_3 + 2S \qquad 3.$$

$$3H_2S + 1\tfrac{1}{2}O_2 \rightarrow 3S + 3H_2O \qquad 4.$$

B. Carbonyl Sulphide Removal Reactions $$3COS + 3H_2O \rightarrow 3\,CO_2 + 3H_2S \qquad 5.$$

C. Carbon Disulphide Removal Reactions $$CS_2 + 2H_2O \rightarrow CO_2 + 2H_2S \qquad 6.$$

Carbonyl sulphide and carbon disulphide are converted to hydrogen sulphide by reaction with water present with the treating gas or in the bed and the hydrogen sulphide produced is then converted into elemental sulphur as given above in equations 1 to 4.

Iron oxide in the medium which is in the ferric oxide form reacts with hydrogen sulphide to form ferric supplied as shown in the first equation. Ferric sulphide being unstable gets converted to the more stable ferrous sulphide and sulphur (Eq.2). During this process, iron gets reduced to ferrous form and hydrogen sulphide gets oxidized practically to sulphur. The ferrous sulphide on contacting with air gets oxidized as shown in the equation 3 to elemental sulphur and ferric oxide, thus regenerating the same for another cycle of reaction with hydrogen sulphide.

This is thus a catalytic redox process wherein the ferric and ferrous forms of iron are formed during the reaction and regeneration cycles. The product of the reaction is elemental sulphur. The net results of the reaction cycle is the oxidation of hydrogen sulphide to elemental; sulphur by the oxygen in the air as show in the equation 4.

Also, other sulphur containing compounds such as carbonyl sulphide and carbon disulphide are also converted into hydrogen sulphide as shown in reaction 5 & 6 and subsequently to elemental sulphur as given in Equations 1 to 4.

DETAIL DESCRIPTION OF THE INVENTION

The Present invention relates to a catalyst useful for removal of hydrogen sulphide from gas streams containing the same and its conversion to elemental sulphur, the said catalyst comprising 0 to 95% by weight clay, 0 to 95% by weight gypsum and 0 to 95% by weight alumina and 5 to 60% by weight hydrated iron oxide and heated to temperatures between 100 and 650° C. for enhanced activity.

Yet another embodiment of the present invention, wherein the weight percentages of clay, gypsum, and alumina are not simultaneously equal to zero.

Yet another embodiment of the present invention wherein said catalyst comprising 5 to 60% by weight clay 5 to 80% by weight gypsum and 5 to 40% by weight alumina and 6 to 40% by weight hydrated iron oxide.

Yet another embodiment of the present invention, wherein clays are selected form the group comprising Kalonite, Montomorillonite/Semectite, Illite and Chlorite.

Yet another embodiment of the present invention wherein clays are selected form the Semectrite group.

Yet another embodiment of the present invention, wherein clay used is bentonite clay.

Yet another embodiment of the present invention wherein said catalyst contains ferric ions as active sites, which chemisorbs hydrogen sulphide present in the gas stream and converts the same into elemental sulphur.

Yet another embodiment of the present invention, wherein said catalyst has pH value in the range of 8.0 to 10.0.

Yet another embodiment of the present invention, wherein said catalyst is heat treated at temperature in the range of 100° C. to 650° C. before use for activating the same.

Yet another embodiment of the present invention, wherein 100 gm of said catalyst chemisorbs 2860 to 28600 mg of hydrogen sulphide from gas stream in one cycle.

Yet another embodiment of the present invention, wherein said spent catalyst containing sulphides of iron is regenerated by passing air through the same at ambient temperature.

Yet another embodiment of the present invention, wherein regenerated catalyst treats and removes hydrogen sulphide from the gas stream and converts the same to elemental sulphur in the subsequent cycles of chemisorption and regeneration.

Yet another embodiment of the present invention, wherein the catalyst is used in at least 15 chemisorption and regeneration cycles during its use.

Yet another embodiment of the present invention, wherein sulphides of iron present in the spent catalyst is converted to $Fe_2O_3$ during regeneration thereby producing elemental sulphur and regenerating the catalyst.

Yet another embodiment of the present invention, wherein the elemental sulphur recovered has purity more than 99%.

Yet another embodiment of the present invention, wherein said catalyst is used in fixed bed reactors or fluidized bed reactors.

Yet another embodiment of the present invention, wherein said catalyst is divided into fine particles having particle size in the range of 100 μm to 2000 μm for use in the fluidized bed reactor.

Yet another embodiment of the present invention, wherein said catalyst is pelletized or granulated to obtain pellets/granules having diameter in the range of 0.5 mm to 10.0 mm for use in fixed bed reactors.

A further embodiment of the present invention relates to a process for preparing a catalyst useful for removing hydrogen sulphide from a gas stream and recovering elemental sulphur therefrom, said process comprising the steps of
  a) mixing of 0 to 95% by weight clay, 0 to 95% by weight gypsum, 0 to 95% by weight alumina and 5 to 60% by weight hydrated iron oxide.
  b) granulating, pelletizing or pulverizing the mixture of step (a) and heating the same at temperature in the range of 100° C. to 650° C. to obtain the catalyst.

Still further embodiment of the present invention, wherein in step (a) the hydrated iron oxide is prepared from commonly available salts of iron such as ferric, nitrate, ferric chloride, ferric sulphate and commonly available alkali ammonium hydroxide, sodium hydroxide and potassium hydroxide.

Yet another embodiment of the present invention wherein 100 gm of the catalyst thus obtained chemisorb 2860 to 28600 mg of hydrogen sulphide gas from the gas stream.

Yet another embodiment of the present invention wherein the catalyst thus obtained pH value in the range of 8.0 to 10.0.

Yet another embodiment of the present invention wherein the catalyst thus obtained is used in fixed bed reactor or fluidized bed reactor.

Yet another embodiment of the present invention wherein catalyst thus obtained contain ferric ions as active sites.

Yet another embodiment of the present invention wherein the catalyst thus obtained is pulverized into fine particles for use in fluidized bed reactors.

Yet another embodiment of the present invention wherein in step (b), the mixture of step (a) is pelletized or granulated to obtain pellets/granules having diameter in the range of 0.5 mm to 10 mm for use in fixed bed reactors.

Still further embodiment of the present invention relates to a method for removal of sulphur compounds from a gas stream comprising the same and recover of elemental sulphur therefrom said method comprising the steps of
  a) mixing most air/water with the gas stream comprising the sulphur compounds for converting the sulphur compound to hydrogen sulphide.
  b) Contacting the gas stream containing hydrogen sulphide, with a catalyst comprising to 0 to 95% by weight clay, 0 to 95% by weight gypsum, 0 to 95% by weight alumina and 5 to 60% by weight hydrated iron oxide to remove hydrogen sulphide by chemisorption, and
  c) regenerating the spent catalyst by passing air through or over the same to oxides of iron and converting iron sulphides to iron oxides and elemental sulphur.

In yet another embodiment of the present invention, wherein compounds of sulphur are hydrogen sulphide, carbonyl sulphide (COS), and carbon disulphide ($CS_2$) and mixtures thereof.

Yet another embodiment of the present invention wherein the gas streams containing hydrogen sulphide from trace level to 100% level is treated to get outlet gas stream free of the same.

Yet another embodiment of the present invention, wherein the color of the catalyst changes from reddish brown to black during step (b) chemisorption and it changes back to reddish brown on regeneration, this property being useful in visually monitoring the progress of the chemisorption and regeneration cycles respectively.

Yet another embodiment of the present invention, wherein the spent catalyst is regenerated by passing an oxygen contains gas through or over the same.

Yet another embodiment of the present invention, wherein removal of the sulphur compound from the gas stream and regeneration of catalyst are optionally carried out simultaneously.

Still another embodiment of the present invention, wherein removal of the sulphur compound from the gas stream and regeneration of catalyst are simultaneously carried out by contacting gas stream containing sulphur compounds & an oxygen containing gas simultaneously with the catalyst.

Yet another embodiment of the present invention, wherein the rate of simultaneous reaction and regeneration of catalyst depends on the flow rates of gas stream and ratio of gas stream and oxygen containing gas as well as the hydrogen sulphide content of the gas stream.

Yet another embodiment of the present invention, wherein the percentage of regeneration of spent catalyst is 100% when oxygen containing gas is passed through or over the spent catalyst.

Yet another embodiment of the present invention, wherein the process is carried out in fluidized bed reactors or fixed bed reactors.

Yet another embodiment of the present invention, wherein the elemental sulphur obtained has purity more than 99%.

Yet another embodiment of the present invention, wherein 100 gm of said catalyst chemisorbs 2860 to 28600 mg of hydrogen sulphide from said gas stream in one cycle.

The invention is different from the ones reported so far as that a solid medium incorporating iron hydroxide in the bulk of the same is prepared by mixing the ingredients which are naturally occurring, non toxic and non hazardous in nature with iron hydroxide and heat treating the same to get high activity for hydrogen sulphide removal and its conversion to elemental sulphur. The iron hydroxide is prepared from any common iron salts such as iron chloride, iron sulphate and iron nitrate by treatment with alkalis such as sodium hydroxide, potassium hydroxide or ammonium hydroxide. The mixture of iron hydroxide and the support medium is converted to granules or pellets for easy packing (filling) in a column and treated to temperatures between 100 to 600° C. to increase the reactivity of the iron oxide towards hydrogen sulphide as well as to make the regeneration of the same with oxygen containing gases possible. The granules help to reduce pressure drop across the column through allowing easy passing of the gas through the same. This eliminates requirement of high pressure for the gas being treated.

The iron hydroxide in the medium is converted to iron oxide by a process of heat treatment of the granules/pellets. Preparation of the solid medium incorporating the iron salt is done at relatively low temperatures as compared to the one report recently (ref. U.S. Pat. No. 6,500,237) wherein a calcined material is used for impregnation of the active matter wherein the iron hydroxide adheres to the exposed surfaces of the medium. The total hydrogen sulphide treatability is also found be higher as compared to the prior art.

Another advantage of the process is that the sulphur deposited on the solid medium can be recovered by extraction with a suitable solvent like carbon disulphide or carbon tetrachloride or other organic solvents in which sulphur is soluble. Sulphur can also be extracted by heating the medium above sulphur melting temperature as a solid or alternatively by slurring in water and hearing the slurry to above the melting point of sulphur. The molten sulphur can be separated from the slurry containing the support medium. The recovered sulphur is of high quality and can be used for downstream applications. In cases where the user is not interested in extraction of sulphur the bed can be disposed off safely without further treatment due to the non-toxic nature of the medium and its contents.

We thus report here an improved process for hydrogen sulphide removal from gas streams using a novel solid bed made by incorporating iron oxide in a mixture of materials and heating the same to a temperature high enough to make it chemically active and porous for easy availability of the reactive sites in the solid. The material can be regenerated using a simple process and reused multiple number of times to convert hydrogen sulphide to elemental sulphur. The sulphur thus deposited on the bed can be recovered using methods known in prior art.

Accordingly, the present invention provides a novel catalytic process for hydrogen sulphide removal from sour gas streams and its conversion to sulphur using regenerative solid bed consisting of finely divided iron oxide or its hydrated form made from common salts of iron such as chloride, sulphate and nitrate and an alkali such as hydroxides of sodium, potassium or ammonium and incorporated in a support medium consisting of naturally occurring clays and minerals singly or as mixture to impart stability in the granules or pellets made from the mixture followed by heating the granules or pellets to a temperature high enough to enhance its reactivity towards hydrogen sulphide as well as enabling the regeneration of the iron oxide by conversion of the iron sulphide formed to sulphur and iron oxide on treatment with oxygen containing gas, the size of the pellets or granules being not limiting in the hydrogen sulphide removal characteristics of the solid bed medium.

The Applicant surprisingly found that in the composition of the catalyst, the amount of iron oxide incorporated plays a vital role in determining the suitability of the catalyst in the process of removal of hydrogen sulfide from the gaseous stream. More particularly, the applicants noticed that if the amount of iron oxide is incorporated in the catalyst composition was less than 5% by weight, the catalyst did not efficiently remove $H_2S$ from the gaseous stream. The applicants were of the opinion that increasing the amount of hydrated iron oxide in the catalyst composition would increase its efficacy in removing $H_2S$ from the gaseous stream. However, surprisingly, the applicants above hypothesis were found to be wrong. The applicants surprisingly noticed that increasing the amount of hydrated iron oxide incorporated in the catalyst composition beyond a certain range adversely affected other properties of the catalyst and made it unsuitable for use in the process. More particularly, increasing the amount of the hydrated iron oxide incorporated in the catalyst composition beyond 60% adversely affected the pelletization and granulizing properties of the catalyst. As the main aim of the present invention is to provide catalysts which are stable enough for regeneration, any adverse effect on the pelletization and granulization properties of the catalyst rendered the same unsuitable for even a single regeneration.

The applicants would also like to emphasis here that in step of heating the catalyst prior to use plays a vital role on the efficacy of the process for removal of $H_2S$ from the gaseous state. The applicant noticed that if the catalyst is used without prior heating, the removal of $H_2S$ content from a gaseous stream is not significant. This is due to the fact that pore formation in the catalyst does not take place and hence very less contact surface area is available for the absorption of $H_2S$ gas. Applicant also noticed that if the catalyst is heated prior to use, pores are developed in the catalyst and enhance the absorption of the H2S gas by providing more contact surface area.

Applicant also noticed that if the catalyst is heated prior to use, some iron oxide present in the interior part of the catalyst, come out on the outer surface and provide enhanced activity to the catalyst.

Applicant also noticed that heating the catalyst continuously and above a certain temperature adversely affects the activity of the catalyst. More particularly, the applicants noticed that the heating the catalyst above the 600° C. destroy the catalytic activity. The applicants found that when the catalyst is heated above 600° C. the non oxide undergoes a transformation in the state and the transformed state does not provide any catalytic activity.

Hence, the amount of iron oxide included in the catalyst and the temperature up to which the catalyst is heated are critical and non-obvious aspects of the present invention. None of the document available, teach or suggest these critical and non-obvious features.

This invention is described in detail in the following examples which are provided by way of illustration only and therefore should not be construed to limit the scope of the invention.

BRIEF DESCRIPTION OF TABLES

Table 1 shows the results obtained of hydrogen sulphide removal from a gas stream at various gas flow rate.

Table 2 compares the result obtained of hydrogen sulphide removal from a gas stream for a heat treated catalyst with non heat treated catalyst.

Table 3 shows the result obtained of hydrogen sulphide removal from a gas stream mix with $N_2$ or $CO_2$ or $CH_2$ and air.

Table 4 shows oxygen content in outlet gas stream after passing through said catalyst.

Table 5 shows number of regeneration cycle performing for hydrogen sulfide removal with said catalyst.

Table 6 shows result obtained of hydrogen sulphide removal from a gas stream having various $H_2S$ $O_2$ ratio.

EXAMPLES

Example 1

A solution of iron (III) nitrate (1000 g) in water is prepared and was treated with sodium hydroxide solution (20 g in 100 g water) in an agitated vessel to precipitate iron hydroxide. The precipitated iron hydroxide was allowed to settle, the supernatant clear liquid was discarded and the solid recovered by filtration and washed with water to remove dissolved salts.

The iron hydroxide (250 gm) thus isolated was mixed thoroughly with the solid support material bentonite clay (250 gm), alumina (125 gm) and gypsum (700 gm) and converted to granules (3 mm diameter) in a granulating drum or pellets in a pelletizer (4 mm diameter).

The granules/pellet were dried, treated at temperatures of 450 to 550° C. and used for removal of hydrogen sulphide and other toxic gases contained in gas streams as given in the following examples.

Example 2

A solution of iron (III) nitrate (1000 g) in water is prepared and was treated with sodium hydroxide solution (20 g in 100 g water) in an agitated vessel to precipitate iron hydroxide. The precipitated iron hydroxide was allowed to settle, the supernatant clear liquid was discarded and the solid recovered by filtration and washed with water to remove dissolved salts.

The wet hydrated iron hydroxide obtained above (560 gm, corresponding to 11.50% ferric hydroxide on dry basis) was mixed thoroughly with the solid support material bentonite clay (250 gm), alumina (125 gm and gypsum (700 gm) and converted to granules (3 mm diameter) in a granulating drum or pellets in a pelletiser (4 in diameter).

The granules/pellets were dried, treated at temperature of 450 to 550° C. and used for removal of hydrogen sulphide and other toxic gases contained in gas streams as given in the following examples. The pellets thus obtained had iron content of 6.0% by wt. and good granule integrity and crushing strength.

Example 3

The wet hydrated iron hydroxide obtained above (1500 gm, corresponding to 68% ferric hydroxide on dry basis in the mixture) was mixed thoroughly with the solid support material bentonite clay (100 gm), alumina (50 gm) and gypsum (125 gm). The material was granulated in a granulator, however, it could not be formed into granules of good crushing strength. Attempts at pelletsation also failed.

Example 4

The solid bed medium (225 gms), reddish brown in colour prepared as given in Example 1 above was packed in a glass column of 32 mm diameter and 350 mm height. Gas containing a mixture of hydrogen sulphide (1.14% by volume), and rest nitrogen was passed through the bed at the flow rate of 0.30 litre per minute. The outlet gas was found to be free from hydrogen sulphide. The bed became black in colour as the hydrogen sulphide reacted with it and when the bed was exhausted, the material became totally black as shown by the presence of hydrogen sulphide in the outlet gas. Heat generation was observed during the chemisorption cycle.

Through the medium in the column which was now black in colour, ambient air was passed. Slowly the column restored to its original reddish brown colour, thus indicative of its regeneration. Heat generation was observed during the regeneration cycle.

Through the above regenerated medium, hydrogen sulphide containing gas was again passed as above and the outlet gas was found to be free from the sour gas. The reaction regeneration cycle was repeated 20 times in this manner and the column was found to be reactive to hydrogen sulphide removal without significant reduction in hydrogen sulphide removal capacity.

Example 5

As described in example 2 above, gas containing a mixture of hydrogen sulphide (4.7%, 47000 ppm by volume) and rest nitrogen was passed through the bed at the flow rate of 0:140 litre per minute. The outlet gas was found to be free from hydrogen sulphide. The bed became black in colour as the hydrogen sulphide reacted with it and when the bed was exhausted, the material became totally black as evident by the presence of hydrogen sulphide in the outlet gas.

Example 6

The solid bed medium 100 g as prepared in example 1 was taken in a glass column of 32 mm diameter. Catalyst bed height measured which was 14 centimeter. Moist Gas containing a mixture of hydrogen sulphide (15.4% by volume) and rest nitrogen was passed through the bed at the flow rate of 0.230 litre per minute. The mixture was passed till hydrogen sulphide concentration in the outlet gas stream reached 100 ppm.

Example 7

The solid bed medium (150 gms), reddish brown in colour, prepared as given in Example 1 above, was packed in a glass column of 32 mm diameter and 235 mm height. Pure hydrogen sulphide was passed through the bed at the flow rate of 0.04 litre per minute. The bed became black in colour as the hydrogen sulphide reacted with it. Outlet of the column was passed through a cadmium acetate solution (1 gm cadmium acetate dissolved in 100 gms of water) to detect hydrogen sulphide presence in the treated gas. (Hydrogen sulphide reacts with cadmium acetate to form yellow precipitate of cadmium sulphide). Hydrogen sulphide was not detected in column outlet until last 2 cms of unexhausted bed was available for reaction with hydrogen sulphide as per the visual indication. Heat generation was observed during the chemisorption cycle.

Example 8

The solid bed medium, 100 g, as prepared in Example 1 was filled in a glass column of 32 mm diameter to a height 14.5 centimeters. Gas containing a mixture of hydrogen sulphide (3% by volume) and rest methane was passed through the bed at the flow rate of 0.20 litre per minute. The results of outlet stream hydrogen sulphide concentration noted and are as given below.

After passing 37 litres of gas in 185 min, 100 ppm of hydrogen sulphide was observed in the outlet gas and the column was taken for regeneration. After passing ambient air through the bed, it regained its original colour and became active for next cycle of chemisorption.

Example 9

The solid bed medium (100 g), reddish brown in colour prepared as given in Example 1 above was packed in a glass column of 32 mm diameter. Gas containing a mixture of hydrogen sulphide (9.1% by volume), and rest carbon dioxide was passed through the bed at the flow rate of 0.05 litre per minute. As the hydrogen sulphide reacts with the ferric ions to form iron sulphide, the colour of the bed changes from reddish to black. Hydrogen sulphide in treated stream was found to be below traceable level until 15.86 litres of gas mixture was passed. The experiment was continued till hydrogen sulphide concentration in treated gas stream and inlet gas stream became same. Total 40.26 litres of gas was treated in this manner.

Through the solid bed in the column which was now black in colour, ambient moist air was passed till it regained its original colour, indicative of its regeneration. Heat generation was observed during the regeneration cycle.

Example 10

The solid bed medium (100 g), reddish brown in colour prepared as given in Example 1 above is packed in a glass column of 32 mm diameter. Gas containing a mixture of hydrogen sulphide (4.75% by volume) with nitrogen was passed through the column. The experiment was repeated under identical conditions with fresh bed, but with different gas flow rates In all cases gas was passed till hydrogen sulphide level in outlet gas stream reached 100 ppm level. Quantity of gas treated and hydrogen sulphide removed were measured. Results are given in Table 1 below.

TABLE 1

| Gas Flow Rate ml/min | Gas Velocity M/min | Total volume of gas treated (Liters) | Volume of hydrogen sulphide removed, Liters | Residence Time, Seconds |
|---|---|---|---|---|
| 100 | 0.12 | 19.53 | 0.93 | 62.70 |
| 150 | 0.18 | 22.275 | 1.06 | 41.80 |
| 300 | 0.36 | 18.36 | 0.87 | 21.70 |
| 400 | 0.48 | 7.20 | 0.34 | 16.64 |

As the volume of gas that could be treated remained nearly same upto a flow rate of 300 ml/min, the above example has shown that the residence time required for reaction was about 21 secs.

Example 11

The solid bed medium (100 g), reddish brown in colour prepared as given in Example 1 above was packed in a glass column of 32 mm diameter. Gas containing a mixture of Hydrogen sulphide (5% by volume) with nitrogen was passed through the column.

Keeping the gas mixture same, experiment was conducted for following conditions.
  i. Solid bed medium treated with ambient moist air for 1 hour before treatment with gas. Moist gas was passed through the catalyst bed till hydrogen sulphide concentration in the outlet gas stream reached above 100 ppm.
  ii. Solid bed medium treated with ambient moist air for 2 hour before treatment with gas. Dry gas was passed through the solid bed till hydrogen sulphide concentration in the outlet gas stream was more than 100 ppm.

iii. The catalyst was not given any treatment prior to experiment. Dry gas mixture was passed through the solid bed till hydrogen sulphide concentration in the outlet gas stream was more than 100 ppm.

The results of above three cases are given in Table 2 below.

TABLE 2

Hydrogen Sulphide Concentration: 5% by volume

| | Gas velocity Cm/Second | Residence Time Seconds | Total gas Treated until outlet $H_2S$ concentration reached 100 ppm Liters | Total $H_2S$ removed Liters |
|---|---|---|---|---|
| Case I | 0.41 | 31.36 | 18.00 | 0.90 |
| Case II | 0.41 | 31.36 | 18.90 | 0.945 |
| Case III | 0.41 | 31.36 | 14.40 | 0.72 |

The results show that in case where the bed was pre treated with moist ambient air higher hydrogen sulphide removal capacity was observed compared to the bed which was not given pre treatment with moist ambient air. Moisture content in the bed and/or moisture in the gas were found to improve hydrogen sulphide removal efficiency.

Example 12

The solid bed medium (225 g), reddish brown in colour prepared as given in Example 1 above was packed in a glass column of 30 mm diameter, bed height of 34 centimeters. Gas containing a mixture of carbon disulphide, (35 ppm by volume) with carbon dioxide was passed through the column at a flow rate of 50 ml per minute. Carbon disulphide ($CS_2$) concentration in the treated gas was measured and found to be below traceable levels.

Example 13

The solid bed medium, reddish brown in colour prepared as given in Example 1 above was packed in a glass column of 15 mm diameter, catalyst bed height of 25 cm. Gas containing a mixture of carbonyl sulphide, COS (5 ppm by volume) with nitrogen was passed through the column at ambient temperature. Carbonyl sulphide (COS) was not traceable in the treated gas.

Example 14

The solid catalyst (25 g) which underwent 8 chemisorption and regeneration cycles was taken in a closed vessel and was mixed with 75 g of water. The mixture was heated at 125° C. for 30 minutes. It was found that sulphur contained in the catalyst melted and separated out from the rest of the solid under these conditions. The vessel was cooled down and lumps of sulphur were recovered.

Example 15

Through the solid catalyst be (25 g) which had undergone 8 chemisorption and regeneration cycles packed in a glass column, Carbon disulphide ($CS_2$) was passed from the top at the flow rate of 20 ml per minute. As $CS_2$ passed through the column, it dissolved the sulphur and the sulphur containing solution was collected at the bottom. Sulphur extraction was continued for 1 hour in this manner. From the $CS_2$ solution containing sulphur, $CS_2$ was distilled out and sulphur, bright yellow crystalline, was isolated Sulphur thus obtained had a purity of 99.99%.

Example 16

The solid bed medium (100 g), reddish brown in colour prepared as given in Example 1 above is packed in a glass column of 32 mm diameter and 130 mm height. The following gas mixtures were passed through fresh columns of identical dimensions with gas flow rate of 0.2 litres per minute in all cases, monitoring the outlet gas quality.

i. Hydrogen sulphide (4.4% by volume) with Carbon dioxide ii. Hydrogen sulphide (5.1% by volume) with nitrogen iii. Hydrogen sulphide (4.26% by volume) with methane and iv. Hydrogen sulphide (4.25% by volume) with air It was found that in all cases, the hydrogen sulphide concentration in outlet was below detectable limits. Gas was passed until hydrogen sulphide concentration in outlet gas stream reached 100 ppm by volume. The quantity of gas treated in the first pass is given in the table below with other parameters.

Quantity of gas treated and hydrogen sulphide removed is given in Table 3 below.

TABLE 3

| Sr. No. | Gas Mixture | Duration Minutes | Gas Flow 1 per min | Total Gas treated | Total H2S Removed Liters |
|---|---|---|---|---|---|
| 1 | Nitrogen + $H_2S$(5.11%) | 100 | 0.20 | 18 | 0.92 |
| 2 | Methane + $H_2S$(4.26%) | 125 | 0.20 | 22.5 | 0.96 |
| 3 | Carbon Dioxide + $H_2S$(4.40%) | 115 | 0.20 | 20.7 | 0.91 |
| 4 | Air + $H_2S$(4.25%) | 835 | 0.30 | 225.5 | 9.58 |

Above data indicates that hydrogen sulphide removal capacity is not significantly affected by the presence of carbondioxide, nitrogen and methane. In case of air, chemisorption and regeneration were found to take place simultaneously and the bed could be used continuously, thus resulting in the treatability of about 10 times the gas that could be treated on one pass in the absence of air.

Example 17

The solid bed medium (229 g) which was treated with hydrogen sulphide (black in colour) was packed in a glass column of 30 mm dia. Height of the catalyst bed was 300 mm. Catalyst which was black in color was treated with ambient air for regeneration. Air at the rate of 0.1 Litres per minute was passed through the column. Catalyst color started changing from black to grayish and ultimately to reddish brown with yellow tinge. Color charge started from the bottom portion and moved up as bottom layer of catalyst got regenerated. Outlet air samples were analyzed for oxygen content. The results are given in Table 4 below.

TABLE 4

| Sr. No. | Time (Minutes) | Oxygen Content % |
|---------|----------------|------------------|
| 1 | 0 | 20.8 |
| 2 | 30 | 4.84 |
| 3 | 60 | 5.32 |
| 4 | 90 | 8.46 |
| 5 | 150 | 17.35 |
| 6 | 200 | 20.5 |

Regeneration was found to be complete after 200 minute and the bed regained hydrogen sulphide removal activity. During regeneration, heat generation was observed and moisture was found deposited on the walls of the column.

Example 18

The solid bed medium (225 g) reddish brown in colour prepared as given in Example 1 above is packed in a glass column of 32 mm diameter. Catalyst bed height was 310 mm. Gas containing hydrogen sulphide and carbon dioxide was passed from the bottom of the column. After exhaustion of the catalyst bed, the same was regenerated with ambient air. After exhaustion of the catalyst bed, the same was regenerated with ambient air. Regenerated catalyst bed was again used for hydrogen sulphide removal. Reaction and regeneration cycles were carried out on the same column 20 times even after which the bed maintained its hydrogen sulphide removal capacity. The colour of the bed became yellowish due to presence of elemental sulphur. Results of the different runs are given in Table 5 below.

TABLE 5

| | Run No. | | | | | | | | | |
|---|---|---|---|---|---|---|---|---|---|---|
| | 1 | 2 | 3 | 4 | 5 | 6 | 7 | 8 | 9 | 10 |
| $H_2S$ Treated, lit | 4.01 | 3.91 | 3.59 | 3.64 | 2.75 | 3.38 | 4.35 | 4.87 | 3.55 | 3.99 |
| Run No. | 11 | 12 | 13 | 14 | 15 | 16 | 17 | 18 | 19 | 20 |
| $H_2S$ Treated, lit | 3.92 | 4.46 | 3.73 | | | | | | | |

Example 19

The solid bed medium (100 g), reddish brown in colour, prepared as given in Example 1 above, was taken in the glass column of 32 mm dia. And the following experiments were conducted with gas and air mixtures.

Case I. A gas mixture containing hydrogen sulphide (1% by volume in carbondioxide and air were mixed in the ratio of 1 0.075 (0.075 liter air per litre of gas) and the mixture at a flow rate of 0.30 litres per minute was passed through the column, to enable concurrent reaction and regeneration cycles. As oxygen is the regeneration agent, the gas mixture was prepared such that hydrogen sulphide to oxygen ratio was around 1:1.5. The treated gas was tested for the presence of hydrogen sulphide. Hydrogen sulphide in outlet gas stream was not traceable. The results and observations are given in the Table 6 below. Case II: A gas mixture containing hydrogen sulphide (1.5% by volume in carbondioxide) and air were mixed in the ratio of 1:0.30 (0.30 litre air per litre of gas) and the mixture at a low rate of 0.30 litres per minute was passed through the column, to enable concurrent reaction and regeneration cycles. As oxygen is the regeneration agent, the gas mixture was prepared such that hydrogen sulphide to oxygen ratio was around 1:4. The treated gas was tested for the presence of hydrogen sulphide. Hydrogen sulphide in outlet gas stream was not traceable. The results and observations are given in the Table 6 below.

TABLE 6

| | $H_2S$ Conc. % | $H_2S$:$O_2$ Ratio | Gas Flow Rate Lit/Minutes | Total Gas treated, l |
|---|---|---|---|---|
| Case I | 1 | 1:1.5 | 0.300 | 64.23 |
| Case II | 1.5 | 1:4 | 0.300 | |

Results of the above experiments indicate that with $H_2S$ to oxygen ratio higher than 1:4, the hydrogen sulphide removal and its conversion to sulphur can be carried out in a single step without separate reaction and regeneration cycles. This is particularly useful for cases where the gas containing hydrogen sulphide has no downstream applications, hence can be treated for its removal and then vented to air.

The invention claimed is:

1. A catalyst useful for removal of hydrogen sulphide from a gas stream containing hydrogen sulfide and conversion of hydrogen sulfide to elemental sulfur, said catalyst comprising 0 to 95% by weight clay, 5 to 95% by weight gypsum, 0 to 95% by weight alumina, and 5 to 60% by weight hydrated iron oxide the catalyst having enhanced activity after heated to a temperature between 100 and 650° C.

2. A catalyst as claimed in claim 1, wherein said clay is selected from the group consisting of Kalonite, Montomorillonite/Semectite, Illite and Chlorite.

3. A catalyst as claimed in claim 2, wherein said clay is selected from the Semectite group.

4. A catalyst as claimed in claim 3, wherein said clay is bentonite clay.

5. A catalyst as claimed in claim 1, wherein said catalyst contains ferric ions as active sites, which chemisorbs hydrogen sulfide present in the gas stream and converts the same into elemental sulfur.

6. A catalyst as claimed in claim 1, wherein said catalyst has a pH value in the range of 8.0 to 10.0.

7. A catalyst as claimed in claim 1, wherein 100 gm of said catalyst chemisorbs 2860 to 28600 mg of hydrogen sulfide from said gas stream in one cycle.

8. The catalyst as claimed in claim 1, wherein said catalyst is used in fixed bed reactors or fluidized bed reactors.

9. The catalyst as claimed in claim 1, wherein said catalyst is divided into fine particles having particle size in the range of 100 μm to 2000 μm for use in the fluidized bed reactor.

10. The catalyst as claimed in claim 1, wherein said catalyst is palletized or granulated to obtain pellets/granules having diameter in the range of 0.5 mm to 10.0 mm for use in fixed bed reactors.

11. A catalyst regenerated by passing air through a spent catalyst at ambient temperature, wherein the spent catalyst comprises sulfides of iron and is produced from the catalyst of claim 1 in the presence of a gas stream containing hydrogen sulfide.

12. The catalyst as claimed in claim 11, wherein the regenerated catalyst is used to treat and remove hydrogen sulfide from the gas stream and convert the hydrogen sulfide from the gas stream to elemental sulfur in subsequent cycles of chemisorption and regeneration.

13. The catalyst as claimed in claim 12, wherein the catalyst is used in at least 15 chemisorption and regeneration cycles.

14. The catalyst as claimed in claim 12, wherein sulfides of iron present in the spent catalyst are converted to $Fe_2O_3$ during regeneration thereby producing elemental sulfur and regenerating the catalyst.

15. The catalyst as claimed in claim 14, wherein the elemental sulfur produced has a purity more than 99%.

16. A process for preparing the catalyst of claim 1 said process comprising the steps of:
    a) mixing 0 to 95% by weight clay, 5 to 95% by weight gypsum, 0 to 95% weight alumina, and 5 to 60% by weight hydrated iron oxide; and
    b) granulating, pelletizing or pulverizing the mixture of step (a) and heating to a temperature in the range of 100° C. to 650° C. so as to obtain the catalyst.

17. A process as claimed in claim 16, wherein in step (a), the hydrated iron oxide is prepared from salts of iron selected from a group consisting of ferric nitrate, ferric chloride, and ferric sulfate and alkali ammonium hydroxide, sodium hydroxide, and potassium hydroxide.

18. A process as claimed in claim 16, wherein 100 gm of the catalyst thus obtained chemisorb 2860 to 28600 mg of hydrogen sulfide gas from the gas stream.

19. A process as claimed in claim 16, wherein the catalyst thus obtained has pH value in the range of 8.0 to 10.0.

20. A process as claimed in claim 16, wherein the catalyst thus obtained is used in fixed bed reactor of fluidized bed reactor.

21. A process as claimed in claim 16, wherein catalyst thus obtained contain ferric ions as active sites.

22. A process as claimed in claim 16, wherein the catalyst thus obtained is pulverized into fine particles for use in fluidized bed reactors.

23. A process as claimed in claim 16, wherein in step (b) the mixture of step (a) is pelletized or granulated to obtain pellets/granules having diameter in the range 0.5 mm to 10 mm for use in fixed bed reactors.

24. A catalyst useful for the removal of hydrogen sulfide from a gas stream containing hydrogen sulfide and conversion of hydrogen sulfide to elemental sulfur, said catalyst comprising 5 to 60% by weight clay, 5 to 80% by weight gypsum, 5 to 40% by weight alumina, and 6 to 40% by weight hydrated iron oxide.

25. A method for removal of sulfur compounds from a gas stream comprising such sulfur compounds, said method comprising the steps of:
    a) mixing moist air/water with the gas stream comprising the sulfur compounds so as to convert the sulfur compounds to hydrogen sulfide,
    b) contacting the gas stream containing hydrogen sulfide with the catalyst of claim 1 so as to remove hydrogen sulfide by chemisorption, and
    c) regenerating the catalyst from a spent catalyst resulting from step b) by passing air through or over the same to convert iron sulfides to iron oxides and elemental sulfur.

26. A method as claimed in claim 25, wherein compounds of sulfur are hydrogen sulfide, carbonyl sulfide (COS), and carbon disulfide ($CS_2$) and mixtures thereof.

27. A method as claimed in claim 25, wherein the gas streams containing hydrogen sulfide from trace level to 100% level is treated to get outlet gas stream free of the same.

28. A method as claimed in claim 25, wherein the color of the catalyst changes from reddish brown to black during step (b) chemisorption and it changes back to reddish brown on regeneration, this property being useful in visually monitoring the progress of the chemisorption and regeneration cycles respectively.

29. A method as claimed in claim 25, wherein the spent catalyst is regenerated by passing an oxygen containing gas through or over the same.

30. A method as claimed in claim 25, wherein removal of the sulfur compound from the gas stream and regeneration of catalyst are optionally carried out simultaneously.

31. A method as claimed in claim 25, wherein removal of the sulfur compound from the gas stream and regeneration of catalyst are simultaneously carried out by contacting gas stream containing sulfur compounds and an oxygen containing gas simultaneously with the catalyst.

32. A method as claimed in claim 25, wherein the rate of simultaneous reaction and regeneration of catalyst depends on the flow rates of gas stream, and ratio of gas stream and oxygen containing gas as well as the hydrogen sulfide content of the gas stream.

33. A method as claimed in claim 25, wherein the percentage of regeneration of spent catalyst is 100% when oxygen containing as is passed through or over the spent catalyst.

34. A method as claimed in claim 25, wherein the process is carried out in fluidized bed reactors or fixed bed reactors.

35. A method as claimed in claim 25, wherein the elemental sulfur obtained has purity of more than 99%.

36. A method as claimed in claim 25, wherein 100 gm of said catalyst chemisorbs 2860 to 28600 mg of hydrogen sulfide from said gas stream in one cycle.

* * * * *